M. TURECK.
LOCKING DEVICE FOR END GATES.
APPLICATION FILED AUG. 16, 1913.
1,097,828.
Patented May 26, 1914.
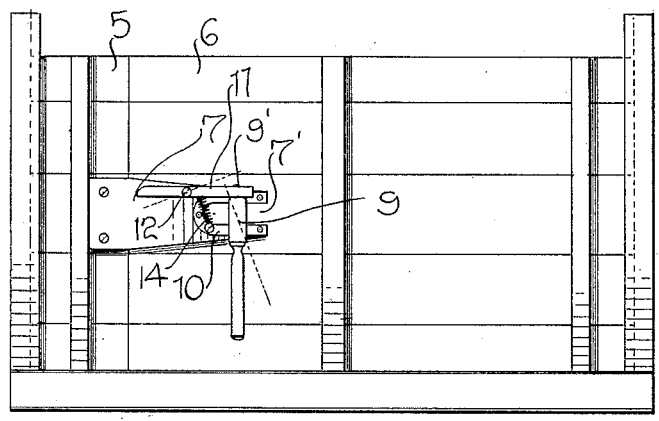
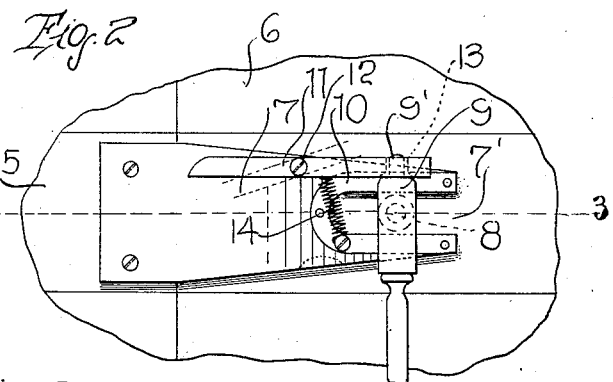
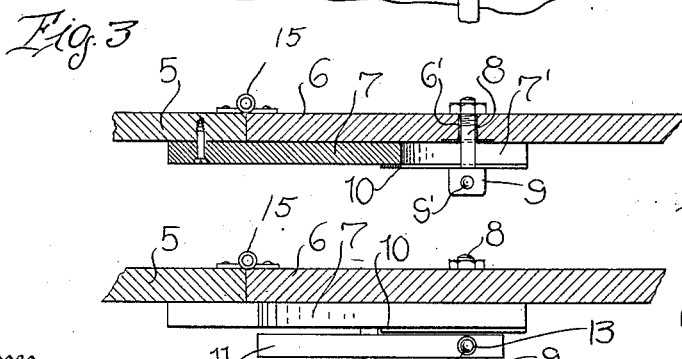
Inventor
MAX TURECK
Witnesses
Robert M. Sutphen
A. J. Hind
By Watson E. Coleman
Attorney

UNITED STATES PATENT OFFICE.

MAX TURECK, OF ANAMOOSE, NORTH DAKOTA.

LOCKING DEVICE FOR END-GATES.

1,097,828.  Specification of Letters Patent.  Patented May 26, 1914.

Application filed August 16, 1913. Serial No. 785,063.

*To all whom it may concern:*

Be it known that I, MAX TURECK, a citizen of the United States, residing at Anamoose, in the county of McHenry and State of North Dakota, have invented certain new and useful Improvements in Locking Devices for End-Gates, of which the following is a specification, reference being had to the accompanying drawings.

This invention relates to wagon end gates, and it more particularly relates to an improved locking device for end gates.

One of the objects of the invention is to provide a safe, secure, convenient and easily manipulated device whereby an end gate may be locked.

Another object of the invention is to provide a device of this character of simple construction, comparatively inexpensive, strong and durable and thoroughly practical and efficient.

In the accompanying drawings which supplement this specification, Figure 1 is a rear end elevation view of the wagon body provided with an end gate constructed in accordance with my invention. Fig. 2 is an enlarged fragmental elevational view of the fastening and locking mechanism of the end gate. Fig. 3 is a horizontal sectional view taken on the line 3—3 of Fig. 2. Fig. 4 is an enlarged horizontal sectional view through the end gate immediately above the locking mechanism.

In these drawings in which similar reference characters correspond with similar parts throughout the several views, the end gate is composed of two hingedly connected sections 5 and 6 respectively, the section 5 being provided with an off-set extension 7, which preferably constitutes a tapering board having one end bifurcated, so as to provide a slot 7', its other end being secured to the body of the section 5 by screws or other proper means. The section 6 is provided with an aperture 6' which extends therethrough and constitutes a bearing for a shank or pivot element 8, the latter being formed on a fastening bar 9, the latter being provided with a handle at one end and with a stud 9' at its other end, extending radially from the shank 8. A bifurcated plate 10 is secured on the extension or batten 7, and constitutes a seat, contiguous to the slot 7', on which the fastening bar rests when in its fastening position; in which position the elements 5 and 6 are locked rigidly together.

In order to prevent the fastening bar 9 from jostling out of its fastening position and passing through the slot 7', I provide a locking bar 11, pivoted at 12 to the batten 7, and being provided with an aperture or recess 13 into which the stud 9' is seated when in locked position. A retractile spring 14 has one end secured to the lever 11, its other end being secured to the batten 7, or to the plate 10 of the batten, and by means of this spring the locking lever is held in engagement with the stud 9', so as to positively and effectually prevent accidental movement of the fastening lever.

In operation, when it is desired to remove the end gate, the handle 11' is pulled downward, so as to raise the aperture of the lever 11 out of engagement with the stud 9' so that the fastening lever may be swung to approximately 90 degrees, into parallel relation with the slot 7', so that the latter may be passed over the contiguous portion of the lever 9, while the sections 5 and 6 swing with relation to each other on their hinges 15 so that the end gate may now be removed from the wagon body in the usual manner. It will also be observed that the spring 14 serves to maintain the perforate extremity of the lever 11 normally in the path of travel of the stud of the bar whereby such lever automatically engages the stud 9' when the bar 9 is in its locking or vertical position. It will be seen that I have provided an improved locking device of this character which is fully capable of attaining the desired objects, as specified in the foregoing, in a thoroughly practical and efficient manner.

While I have shown and described the preferred form of my invention, it will be obvious that various changes in the details of construction and in the proportions may be resorted to for successfully carrying my invention into practice without sacrificing any of the novel features or departing from the scope of the appended claim.

What I claim is:—

In combination with an end gate consisting of two hingedly connected sections, one of such sections having a bifurcated batten secured thereon and adapted to overlie the second section; of a pivotally mounted fastening bar adapted for engagement with the bifurcated end of the batten and being provided with a stud in one end, a locking lever having an aperture in one end adapted to accommodate said stud when the bar is adjusted into locking position relatively to the batten, said lever being pivotally connected intermediately of its length to the batten, the opposite extremity of the lever serving as a handle member, and a retractile spring having one end secured to said locking lever between its pivotal connection and the aperture thereof and its other end to the batten at a point below the lever to hold said lever normally in the path of travel of the stud of the bar, whereby the lever automatically engages the stud of the bar when the bar is in a locking adjustment.

In testimony whereof I hereunto affix my signature in the presence of two witnesses.

MAX TURECK.

Witnesses:
 ORA E. SAHR,
 EMIL PFEIFLE.

Copies of this patent may be obtained for five cents each, by addressing the "Commissioner of Patents, Washington, D. C."